US012573526B2

(12) United States Patent
Mattsson et al.

(10) Patent No.: US 12,573,526 B2
(45) Date of Patent: Mar. 10, 2026

(54) POWER CABLE WITH METALLIC SHEATH JOINT

(71) Applicant: NKT HV Cables AB, Lyckeby (SE)

(72) Inventors: Andreas Mattsson, Karlskrona (SE); Johan Jäderberg, Lyckeby (SE); Joakim Wikström, Karlskrona (SE); Johnny Ericsson, Rödeby (SE); Pontus Danielsson, Lyckeby (SE)

(73) Assignee: NKT HV Cables AB, Lyckeby (SE)

( * ) Notice: Subject to any disclaimer, the term of this patent is extended or adjusted under 35 U.S.C. 154(b) by 160 days.

(21) Appl. No.: 18/529,343

(22) Filed: Dec. 5, 2023

(65) Prior Publication Data

US 2024/0203619 A1 Jun. 20, 2024

(30) Foreign Application Priority Data

Dec. 16, 2022 (EP) .................................... 22214228

(51) Int. Cl.
*H01B 7/28* (2006.01)
*H01B 7/14* (2006.01)
(Continued)

(52) U.S. Cl.
CPC ............ *H01B 7/2825* (2013.01); *H01B 7/14* (2013.01); *H01B 9/04* (2013.01)

(58) Field of Classification Search
CPC .......... H02G 1/10; H02G 1/14; H02G 15/013; H02G 15/068; H02G 15/08; H02G 15/14;
(Continued)

(56) References Cited

U.S. PATENT DOCUMENTS 4,518,819 A * 5/1985 Larsson ................. H02G 15/10 29/857
9,425,605 B2 * 8/2016 Yaworski ........... H02G 15/1833
(Continued)

FOREIGN PATENT DOCUMENTS

CN 109935981 A 6/2019
EP 3879652 A1 * 9/2021 ............... H01B 7/02
(Continued)

OTHER PUBLICATIONS

Extended European Search Report; Application No. 22214228.3; Completed: May 11, 2023; Mailed: May 22, 2023; 8 Pages.

*Primary Examiner* — William H. Mayo, III
(74) *Attorney, Agent, or Firm* — Whitmyer IP Group LLC

(57) ABSTRACT

A power cable includes from inside to outside: a conductor; an insulation system having an inner semiconducting layer, an insulation layer, and an outer semiconducting layer; a metallic water blocking layer including a first axial section, a second axial section, and an intermediate axial section arranged between the first axial section and the second axial section and made of a lead-free metal material which is different from a first metal material of at least one of the first axial section and the second axial section. The intermediate axial section is joined thermally along its entire inner or outer perimeter with each of the first axial section and the second axial section to obtain watertight connections. The lead-free metal material has a lower yield strength than the first metal material.

19 Claims, 2 Drawing Sheets

(51) Int. Cl.
*H01B 7/282* (2006.01)
*H01B 9/04* (2006.01)

(58) Field of Classification Search
CPC .... H02G 15/105; H02G 15/117; H02G 15/18; H02G 15/1833; H02G 15/184; H01B 3/307; H01B 7/02; H01B 7/04; H01B 7/06; H01B 7/08; H01B 7/10; H01B 7/12; H01B 7/28; H01B 7/282; H01R 4/72
USPC ......... 174/74 R–88 R, 93; 29/857, 868, 869, 29/871; 524/99, 302, 305, 331, 408
See application file for complete search history.

(56) References Cited

U.S. PATENT DOCUMENTS

| | | | | |
|---|---|---|---|---|
| 11,201,458 | B2 * | 12/2021 | Ekholm | H02G 15/117 |
| 2013/0269976 | A1 * | 10/2013 | Sarkar | H01B 3/441 524/331 |

FOREIGN PATENT DOCUMENTS

| | | | | | |
|---|---|---|---|---|---|
| EP | 4002619 | A1 | | 5/2022 | |
| KR | 102356396 | B1 | | 1/2022 | |
| WO | WO-2022218995 | A1 | * | 10/2022 | H01B 13/24 |

* cited by examiner

POWER CABLE WITH METALLIC SHEATH JOINT

TECHNICAL FIELD

The present disclosure generally relates to power cables comprising a metal sheath.

BACKGROUND

Power cables such as submarine power cables often have a metal layer arranged to provide radial water protection of the insulation system.

The metal layer has historically been made of lead, but it is expected that lead-free materials will be used in the future.

Materials replacing lead in modern power cables are more difficult to handle than lead, which leads to challenges in the manufacturing process.

SUMMARY

In view of the above, an object of the present disclosure is to provide a power cable which solves or at least mitigates the problems of the prior art.

There is hence according to a first aspect provided a power cable comprising: a conductor, an insulation system comprising an inner semiconducting layer arranged around the conductor, an insulation layer arranged around the inner semiconducting layer, and an outer semiconducting layer arranged around the insulation layer, and a metallic water blocking layer arranged around the insulation system, comprising a first axial section, a second axial section, and an intermediate axial section made of a lead-free metal material which is different from a first metal material of at least one of the first axial section and the second axial section, the intermediate axial section being arranged between the first axial section and the second axial section, wherein the intermediate axial section is joined thermally along its entire inner or outer perimeter with each of the first axial section and the second axial section to obtain a watertight connection between the intermediate axial section and each of the first axial section and the second axial section, wherein the lead-free metal material has a lower yield strength than the first metal material.

Since the lead-free metal material has a lower yield strength, it is a softer material than the first metal material. This makes the lead-free metal material more malleable when restoring the metallic water blocking layer between the first axial section and the second axial section of the metallic water blocking layer.

For example, when the metallic water blocking layer is being restored, a metal tube made of the lead-free metal material slid around the insulation system axially bridging the first axial section and the second axial section can be rolled down to the correct dimension such that it contacts the first axial section and the second axial section. After thermal joining the metal tube forms the intermediate axial section.

Restoration of the metallic water blocking layer may for example be required when a conductor joint has been made or in case the insulation system has been damaged during the production process and needs to be repaired.

The first metal material may be a lead-free first metal material.

The power cable may be a high voltage or a medium voltage power cable.

The power cable may be a single core or a multi-core power cable.

The power cable may be an AC power cable or a DC power cable.

According to one example, the first axial section and the second axial section may be made of the first metal material.

According to one example, only one of the first axial section and the second axial section is made of the first metal material. The other one of the first axial section and the second axial section may be made of a second metal material.

According to one embodiment the lead-free metal material has a smaller Young's modulus than the first metal material.

According to one embodiment the lead-free metal material has a melting temperature that is lower than that of the first metal material.

According to one embodiment the lead-free metal material has a Young's modulus of less than 120 GPa, such as less than 80 GPa, such as less than 60 GPa.

According to one embodiment the lead-free metal material has a yield strength of at most 450 MPa, such as at most 250 MPa, such as at most 200 MPa.

According to one embodiment the first metal material comprises copper, stainless steel, or aluminium.

According to one embodiment the second metal material, which is different from the first metal material, comprises one of copper, stainless steel, aluminium, or lead.

According to one embodiment the lead-free metal material comprises at least one of tin, brass, indium, zinc, bismuth, or tellurium.

According to one embodiment the intermediate axial section is joined thermally along its entire inner or outer perimeter with each of the first axial section and the second axial section by means of solder.

According to one embodiment the first metal material and the lead-free metal material in a galvanic cell comprising sea water at a temperature of 10° C. have an electric potential versus Saturated Calomel Electrode, SCE, wherein an absolute value of a difference of the electric potential of the first metal material and the lead-free metal material is at most 500 mV, such as at most 250 mV.

Galvanic corrosion of any of the first metal material or the lead-free metal material of the metallic water blocking layer is thus reduced. The closer the electric potentials of the first metal material and the lead-free metal material are in the galvanic cell, the less galvanic corrosion will occur.

According to one embodiment the first metal material and the lead-free metal material have an overlapping range of electrical potentials versus Saturated Calomel Electrode, SCE, in the galvanic cell.

According to one embodiment the conductor comprises a conductor joint, and wherein the intermediate axial section is arranged around the conductor joint.

According to one embodiment the insulation system comprises a vulcanized insulation system joint, and wherein the intermediate axial section of the metallic water blocking layer is arranged around the vulcanized insulation system joint.

According to one embodiment the power cable is a submarine power cable.

There is according to a second aspect provided a method of manufacturing a power cable, the method comprising: a) providing a conductor, an insulation system comprising an inner semiconducting layer arranged around the conductor, an insulation layer arranged around the inner semiconducting layer, and an outer semiconducting layer arranged around the insulation layer, and a metallic water blocking layer arranged around the insulation system, comprising a first axial section, and a second axial section, wherein the insulation system has an exposed section between the first axial section and the second axial section, b) providing a metal tube around the exposed section, c) optionally performing a diameter reduction of the metal tube, and d) thermally joining the metal tube along its entire inner or outer perimeter with each of the first axial section and the second axial section to obtain a watertight connection between the metal tube and each of the first axial section and the second axial section, the metal tube forming an intermediate axial section between the first axial section and the second axial section, wherein the metal tube is made of a lead-free metal material which is different from a first metal material of at least one of the first axial section and the second axial section, and wherein the lead-free metal material has a lower yield strength than the first metal material.

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
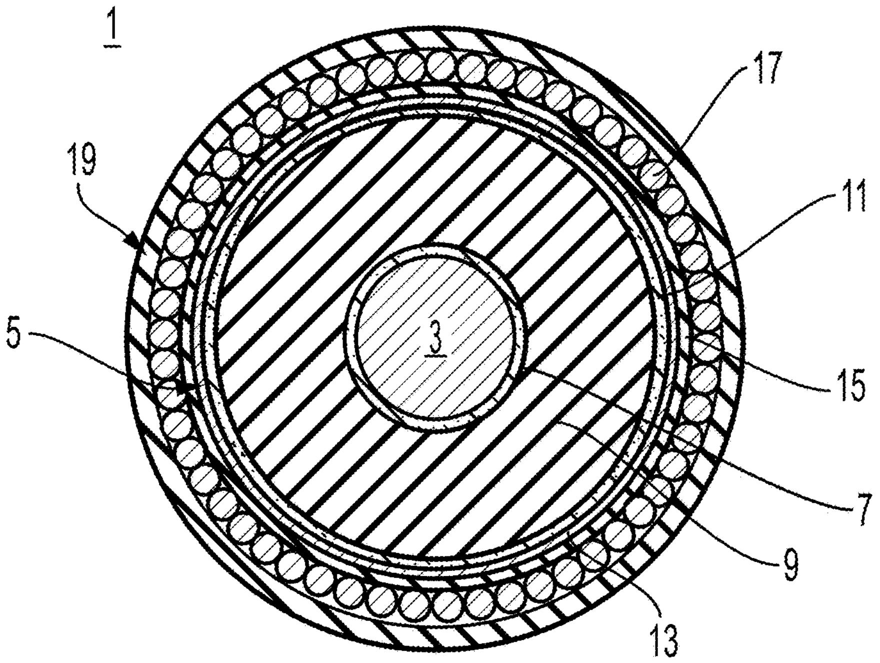
FIG. 1 schematically shows a cross-sectional view of an example of a power cable.

FIG. 1 shows a cross section of an example of a power cable 1. Although the exemplified power cable 1 depicts a single core power cable, the power cable 1 could alternatively be a multi-core power cable.

The power cable 1 may be an AC power cable or a DC power cable.

The power cable 1 may be a submarine power cable or an underground cable.

The power cable 1 comprises a conductor 3, and an insulation system 5 arranged around the conductor 3.

The insulation system 5 comprises an inner semiconducting layer 7 which is arranged around the conductor 3, an insulation layer 9 arranged around the inner semiconducting layer 7, and an outer semiconducting layer 11 arranged around the insulation layer 9.

The insulation system 5 may be an extruded insulation system or a paper-based insulation system which is impregnated with insulating fluid such as an oil.

In case the insulation system 5 is an extruded insulation system, the insulation system comprises a polymer material such as a thermosetting polymer, for example cross-linked polyethylene (XLPE), a thermoplastic polymer such as polypropylene or polyethylene, or ethylene propylene rubber (EPR), or ethylene propylene diene monomer rubber (EPDM).

The power cable 1 also comprises a metallic water blocking layer 13. The metallic water blocking layer 13 is arranged around the insulation system 5. The metallic water blocking layer 13 is thus arranged around the outer semiconducting layer 11.

The metallic water blocking layer 13 is lead-free.

The metallic water blocking layer 13 may be longitudinally welded, i.e., in a longitudinal direction of the power cable 1.

The power cable 1 may comprise a polymer layer 15 arranged around the metallic water blocking layer 13. The polymer layer 15 may be extruded onto the metallic water blocking layer 13. The polymer layer 15 may according to one example be bonded to the outer surface of the metallic water blocking layer 13 by means of an adhesive such as a hot melt adhesive.

The power cable 1 may comprise an armour layer comprising a plurality of armour elements 17 laid helically around the polymer layer 15 in one or more layers.

The power cable 1 may have an outer layer 19 which may be an outer sheath composed of a polymer material, or an outer serving composed of a plurality of helically wound polymeric elements.

Figure 2:
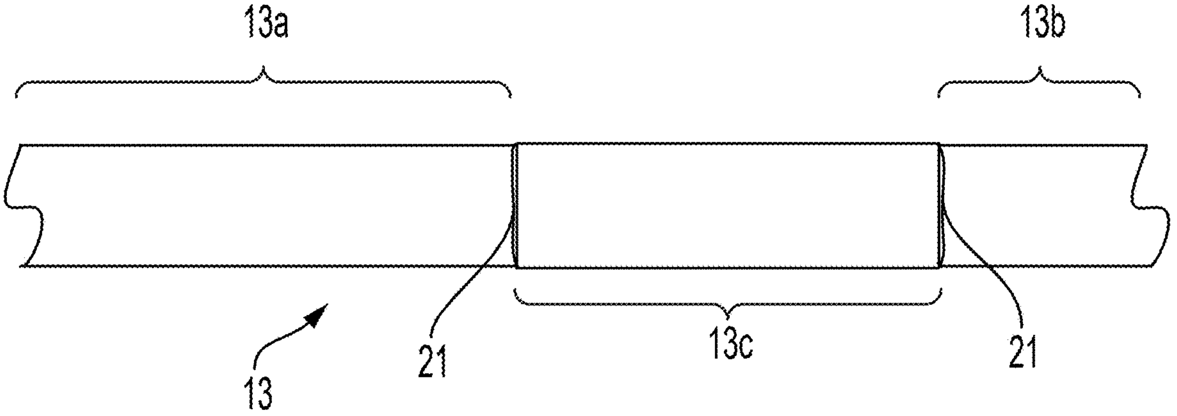
FIG. 2 is a side view of a power cable with the metallic water barrier exposed.

FIG. 2 shows a side view of the power cable 1, with the metallic water blocking layer 13 exposed. Thus, all outer layers, such as the polymer layer 15, the armour layer, and the outer layer 19, are removed to show the structure of the metallic water blocking layer 13.

The metallic water blocking layer 13 comprises a first axial section **13*a*, a second axial section 13*b*, and an intermediate axial section 13*c* arranged axially between the first axial section 13*a* and the second axial section 13*b***.

All three sections **13*a*-13*c* of the metallic water blocking layer 13 are lead-free. Thus, the metallic water blocking layer 13 is lead-free along the first axial section 13*a*, along the intermediate axial section 13*c*, and along the second axial section 13*b***.

The first axial section **13*a* and the second axial section 13*c* are made of a first metal material. Alternatively, only one of the first axial section 13*a* and the second axial section 13*b* is made of the first metal material. The other one of the first axials section 13*a* and the second axial section 13*b* may be made of a second material that is different from the first metal material. The intermediate axial section 13*b*** is made of a lead-free metal material, different from the first metal material.

The lead-free metal material has a lower yield strength than the first metal material.

The lead-free metal material may have a yield strength of at most 450 MPa, such as at most 250 MPa, such as at most 200 MPa, such as at most 180 MPa, such as less than 100 MPa. The yield strength of the lead-free metal material may for example be at most 70 MPa or at most 60 MPa.

The lead-free metal material may have a smaller Young's modulus than the first metal material. The stress-strain curve of the lead-free metal material thus has a less steep slope in the linear elastic region than the first metal material.

The lead-free metal material may have a Young's modulus of less than 120 GPa, such as less than 80 GPa, such as less than 60 GPa.

The lead-free metal material may have a melting temperature that is lower than that of the first metal material. The first metal material may for example have a melting temperature above 500° C., such as above 600° C., and the lead-free metal material may for example have a melting temperature below 500° C., such as below 450° C., such as below 300° C.

The first metal material may for example be copper, such as an oxygen-free copper, a copper alloy, a stainless steel, or aluminium.

The second metal material, which is different from the first metal material, may for example be copper, such as an oxygen-free copper, a copper alloy, a stainless steel, aluminium, or lead.

The stainless steel may be an austenitic stainless steel type such as type 316L as defined by ASTM A240/A240M-22b or equivalents thereof according to EN 10088-1:2005.

The lead-free metal material comprises at least one of tin, brass, indium, zinc, bismuth, or tellurium. The lead-free metal material may according to one example be an alloy comprising at least one of tin, brass, indium, zinc, bismuth, or tellurium.

In a galvanic cell comprising sea water at a temperature of 10° C. each of the first metal material and the lead-free metal material may have an electric potential versus Saturated Calomel Electrode (SCE), wherein an absolute value of a difference of the electric potential of the first metal material and the lead-free metal material is at most 500 mV, such as at most 250 mV. The first metal material and the lead-free metal material are thus preferably close to each other in the Galvanic series.

The first metal material and the lead-free metal material may have an overlapping range of electrical potentials versus SCE, in the galvanic cell.

In examples comprising a second metal material, in a galvanic cell comprising sea water at a temperature of 10° C. each of the second metal material and the lead-free metal material may have an electric potential versus Saturated Calomel Electrode (SCE), wherein an absolute value of a difference of the electric potential of the second metal material and the lead-free metal material is at most 500 mV, such as at most 250 mV. The second metal material and the lead-free metal material are thus preferably close to each other in the Galvanic series. The second metal material and the lead-free metal material may have an overlapping range of electrical potentials versus SCE, in the galvanic cell.

The intermediate axial section 13*c* is joined thermally along its entire inner or outer perimeter to each one of the first axial section 13*a* and the second axial section 13*b*. The intermediate axial section 13*c* is by means of the thermal joining sealed in a watertight manner to the first axial section 13*a* and the second axial section 13*b* such that the metallic water blocking layer 13 forms a an axially continuous radial watertight barrier.

The intermediate axial section 13*c* may be joined thermally to the first axial section 13*a* and to the second axial section 13*b* for example by means of solder 21. The solder 21 preferably has similar properties and constituents as the lead-free metal material.

The intermediate axial section 13*c* is typically arranged over a conductor joint, formed by joining the respective conductor of two cable lengths, thus forming the continuous conductor 3. In this case the insulation system 5 and the metallic water blocking layer 13 are restored over a section that extends axially across the conductor joint. The restored section 23 of the insulation system 5, shown in FIG. 3A, may be a vulcanized insulation system joint. The intermediate axial section 13*c* is arranged around the restored section 23 of the insulation system 5.

The intermediate axial section 13*c* could alternatively be arranged over the restored section 23 of the insulation system 5, with no conductor joint being arranged underneath the restored section 23. This may for example be the case if the insulation system has been damaged and restored.

The polymer layer 15 may extend from the first axial section 13*a* to the second axial section 13*b* over the intermediate axial section 13*c*. The polymer layer 15 may for example be extruded over the metallic water blocking layer 13 after the intermediate axial section 13*c* has been thermally joined with the first axial section 13*a* and the second axial section 13*b*. Alternatively, the portion of the polymer layer 15 that extends over the intermediate axial section 13*c* of the metallic water blocking layer 13 may be formed by a shrink tube or a self-amalgamating tape.

With reference to FIGS. 3A-C and FIG. 4 a method of manufacturing a power cable such as power cable 1 will now be described.

In a step a) the conductor 3, the insulation system 5 arranged around the conductor 3, and the metallic water blocking layer 13 arranged around the insulation system 5 are provided. In step a), the insulation system 5 has an exposed section 25 between the first axial section 13*a* and the second axial section 13*b*. The exposed section 25 is without any metallic water blocking layer. The exposed section 25 comprises the restored section 23 of the insulation system 5.

In a step b) a metal tube 27 is provided around the exposed section 25.

The metal tube 27 is made of the lead-free metal material.

Figure 3A:
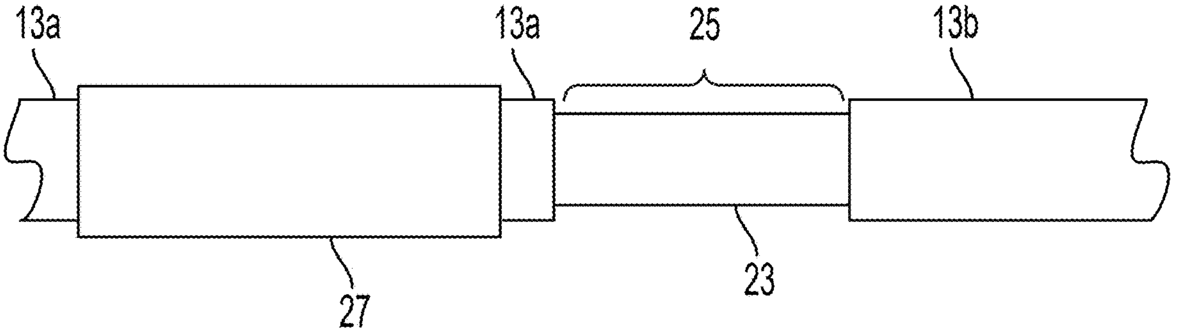
FIGS. 3A-3C show side views of various stages of manufacturing a power cable.
Figure 3B:
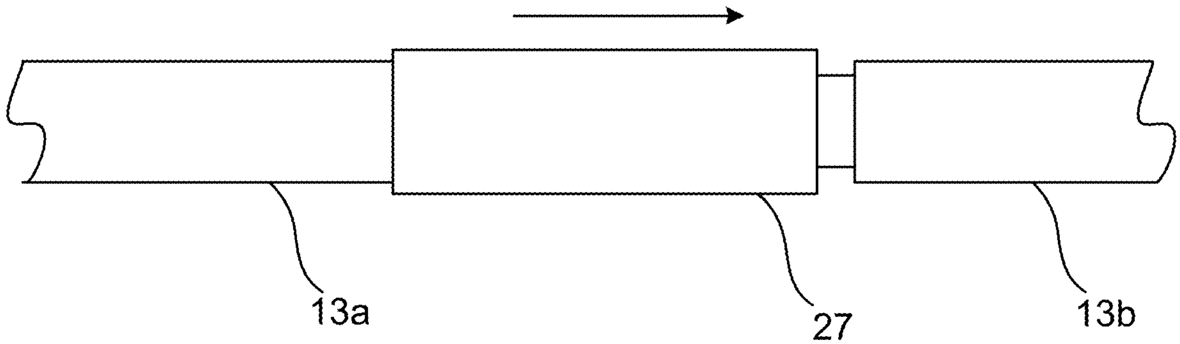

The metal tube 27 may initially be parked on the side of the exposed section 25, as shown in FIG. 3A, and provided around the exposed section 25 by sliding it over the exposed section 25 after the restored section 23 of the insulation system 5 has been completed, as shown in FIG. 3B. Alternatively, the metal tube 27 may be formed from a metal sheath that is wrapped around the exposed section 25 and welded or soldered longitudinally. In this case, it may not be required to slide the metal tube 27 axially in place.

During step b) the metal tube 27 has a larger inner diameter than an outer diameter of the metallic water blocking layer 13 in the first axial section 13*a* and the second axial section 13*b*. This facilitates the handling of the metal tube 27 up to and including step b).

After step b) the metal tube 27 extends axially over the entire exposed section 25 and bridges the first axial section 13*a* and the second axial section 13*b*.

Figure 3C:
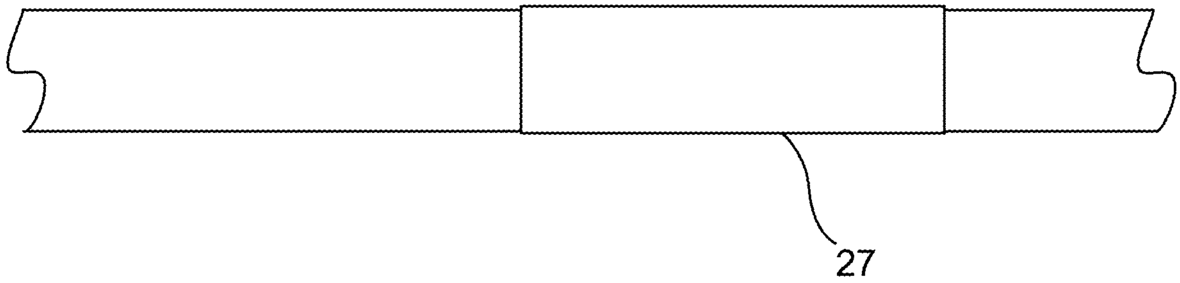
Figure 4:
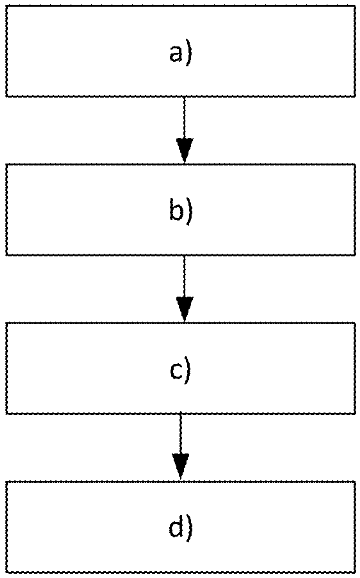
FIG. 4 is a flowchart of a method of manufacturing a power cable.

In a step c) following step b) a diameter reduction of the metal tube 27 is performed. Step c) may be performed by means of one or more rollers and/or a die. The diameter of the metal tube 27 may be reduced such that the inner surface of the metal tube 27 directly contacts an outer surface of each of the first axial section 13*a* and the second axial section 13*b*, as shown in FIG. 3C. In case the metal tube 27 has been welded or soldered longitudinally after it has been wrapped around the exposed section 25, it may not be necessary to perform step c).

In a step d) the metal tube 27 is thermally joined along its entire inner or outer perimeter with each of the first axial section 13*a* and the second axial section 13*b* to obtain a watertight connection between the metal tube 27 and each of the first axial section 13*a* and the second axial section 13*b*.

The metal tube 27 forms the intermediate axial section 13*c* between the first axial section 13*a* and the second axial section 13*b*.

The thermal joining may be made by soldering, for example.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable comprising:

a conductor, an insulation system including an inner semiconducting layer arranged around the conductor, an insulation layer arranged around the inner semiconducting layer, and an outer semiconducting layer arranged around the insulation layer, and a metallic water blocking layer arranged around the insulation system, including a first axial section, a second axial section, and an intermediate axial section made of a lead-free metal material which is different from a first metal material of at least one of the first axial section and the second axial section, the intermediate axial section being arranged between the first axial section and the second axial section, wherein the intermediate axial section is joined thermally along its entire inner or outer perimeter with each of the first axial section and the second axial section to obtain a watertight connection between the intermediate axial section and each of the first axial section and the second axial section, wherein the lead-free metal material has a lower yield strength than the first metal material, wherein the first metal material and the lead-free metal material in a galvanic cell comprising sea water at a temperature of 10° C. have an electric potential versus Saturated Calomel Electrode, SCE, wherein an absolute value of a difference of the electric potential of the first metal material and the lead-free metal material is at most 250 mV.

2. The power cable as claimed in claim 1, the lead-free metal material has a smaller Young's modulus than the first metal material.

3. The power cable as claimed in claim 2, wherein the lead-free metal material has a melting temperature that is lower than that of the first metal material.

4. The power cable as claimed in claim 2, wherein the lead-free metal material has a Young's modulus of less than 120 GPa.

5. The power cable as claimed in claim 2, wherein the lead-free metal material has a yield strength of at most 450 MPa.

6. The power cable as claimed in claim 2, wherein the first metal material comprises copper, stainless steel, or aluminium.

7. The power cable as claimed in claim 2, wherein the lead-free metal material comprises at least one of tin, brass, indium, zinc, bismuth, or tellurium.

8. The power cable as claimed in claim 2, wherein the intermediate axial section is joined thermally along its entire inner or outer perimeter with each of the first axial section and the second axial section by means of solder.

9. The power cable as claimed in claim 1, wherein the lead-free metal material has a melting temperature that is lower than that of the first metal material.

10. The power cable as claimed in claim 1, wherein the lead-free metal material has a Young's modulus of less than 120 GPa.

11. The power cable as claimed in claim 1, wherein the lead-free metal material has a yield strength of at most 450 MPa.

12. The power cable as claimed in claim 1, wherein the first metal material comprises copper, stainless steel, or aluminium.

13. The power cable as claimed in claim 1, wherein the lead-free metal material comprises at least one of tin, brass, indium, zinc, bismuth, or tellurium.

14. The power cable as claimed in claim 1, wherein the intermediate axial section is joined thermally along its entire inner or outer perimeter with each of the first axial section and the second axial section by means of solder.

15. The power cable as claimed in claim 1, wherein the first metal material and the lead-free metal material have an overlapping range of electrical potentials versus Saturated Calomel Electrode, SCE, in the galvanic cell.

16. The power cable as claimed in claim 1, wherein the conductor comprises a conductor joint, and wherein the intermediate axial section is arranged around the conductor joint.

17. The power cable as claimed in claim 1, wherein the insulation system comprises a vulcanized insulation system joint, and wherein the intermediate axial section of the metallic water blocking layer is arranged around the vulcanized insulation system joint.

18. The power cable as claimed in claim 1, wherein the power cable is a submarine power cable.

19. A method of manufacturing a power cable, the method comprising:

a) providing a conductor, an insulation system including an inner semiconducting layer arranged around the conductor, an insulation layer arranged around the inner semiconducting layer, and an outer semiconducting layer arranged around the insulation layer, and a metallic water blocking layer arranged around the insulation system, comprising a first axial section, and a second axial section, wherein the insulation system has an exposed section between the first axial section and the second axial section, b) providing a metal tube around the exposed section, and d) thermally joining the metal tube along its entire inner or outer perimeter with each of the first axial section and the second axial section to obtain a watertight connection between the metal tube and each of the first axial section and the second axial section, the metal tube forming an intermediate axial section between the first axial section and the second axial section, wherein the metal tube is made of a lead-free metal material which is different from a first metal material of at least one of the first axial section and the second axial section, and wherein the lead-free metal material has a lower yield strength than the first metal material, wherein the first metal material and the lead-free metal material in a galvanic cell comprising sea water at a temperature of 10° C. have an electric potential versus Saturated Calomel Electrode, SCE, wherein an absolute value of a difference of the electric potential of the first metal material and the lead-free metal material is at most 250 mV.

* * * * *